(12) United States Patent
Miyahara

(10) Patent No.: US 8,085,419 B2
(45) Date of Patent: Dec. 27, 2011

(54) IMAGE INPUT/OUTPUT SYSTEM, CONTROL METHOD OF IMAGE INPUT/OUTPUT SYSTEM, AND PROGRAM FOR IMPLEMENTING THE METHOD

(75) Inventor: Nobuaki Miyahara, Yokohama (JP)

(73) Assignee: Canon Kabushiki Kaisha (JP)

( * ) Notice: Subject to any disclaimer, the term of this patent is extended or adjusted under 35 U.S.C. 154(b) by 1146 days.

(21) Appl. No.: 11/834,228

(22) Filed: Aug. 6, 2007

(65) Prior Publication Data
US 2008/0055634 A1    Mar. 6, 2008

(30) Foreign Application Priority Data

Sep. 6, 2006 (JP) .................................. 2006-241852

(51) Int. Cl.
*G06F 15/00* (2006.01)
*G06F 15/16* (2006.01)

(52) U.S. Cl. ....................... 358/1.15; 709/205
(58) Field of Classification Search ............... 358/1.15, 358/1.14, 1.13, 1.16, 1.18, 1.1, 1.9, 402; 709/205, 224, 206, 203, 222, 217; 455/500, 455/3.06, 41.2; 710/220, 11; 713/176, 193, 713/162
See application file for complete search history.

(56) References Cited

U.S. PATENT DOCUMENTS

| | | | |
|---|---|---|---|
| 5,911,044 A * | 6/1999 | Lo et al. | 709/203 |
| 2002/0156923 A1 | 10/2002 | Tanimoto | |
| 2006/0085516 A1 * | 4/2006 | Farr et al. | 709/217 |

FOREIGN PATENT DOCUMENTS

| | | |
|---|---|---|
| JP | 63-184462 A | 7/1988 |
| JP | 09-233249 A | 9/1997 |
| JP | 10-326288 A | 12/1998 |
| JP | 11-275291 A | 10/1999 |
| JP | 11-289416 A | 10/1999 |
| JP | 2001-339556 A | 12/2001 |
| JP | 2003-333266 A | 11/2003 |
| JP | 2005-039319 A | 2/2005 |
| JP | 2005-184673 A | 7/2005 |
| JP | 2006-190161 A | 7/2006 |

OTHER PUBLICATIONS

Notification of the Third Office Action issued in corresponding Chinese Patent Application No. 200710141319.6 dated Jul. 15, 2010.
Office Action issued in corresponding Japanese Patent Application No. 2006-241852 dated Mar. 8, 2011.

* cited by examiner

*Primary Examiner* — Saeid Ebrahimi Dehkordy
(74) *Attorney, Agent, or Firm* — Rossi, Kimms & McDowell LLP

(57) ABSTRACT

An image input/output system which makes it possible to reduce a load on a server in the case of using a network scan function in a server based computing environment. An image input/output system comprises a multifunction peripheral, a server, and a computer which are communicably connected to one another via a network. The server receives a reading instruction from the computer and instructs the multifunction peripheral to read an original according to the reading instruction. In the multifunction peripheral, a reader section reads the original based on the instruction from the server, and a control section sends thumbnail image data obtained by the reader section to the computer without going through the server.

7 Claims, 21 Drawing Sheets

IMAGE INPUT/OUTPUT SYSTEM, CONTROL METHOD OF IMAGE INPUT/OUTPUT SYSTEM, AND PROGRAM FOR IMPLEMENTING THE METHOD

BACKGROUND OF THE INVENTION

1. Field of the Invention

The present invention relates to an image input/output system that is applied in the case of instructing to read an original via a network and also obtaining image data read from the original, a control method of the image input/output system, and a program for implementing the control method.

2. Description of the Related Art

Conventionally, there has been known a scanner that reads an image of an original. Also, there has been known a scanner including a network scan function in which the image is read from the original by the scanner according to an instruction from a PC and the PC obtains the image via a network.

Moreover, an environment of a client/server method consisting of client computers and a server installed in a company and the like has been changed in terms of security or costs. Conventionally, a system environment has been constructed with a combination of advanced client computers and the server. However, there has been a problem that the environment has cost for operation and management, such as version upgrade of application programs. Moreover, in the case where confidential data exists in a hard disk of the client computer and the like, there has been a problem of security enhancement required for each client computer.

Therefore, in order to contemplate cost reduction for the operation and the management, and the security enhancement, an idea of a thin client has emerged. The thin client means that client computers provided with minimum functions such as a display function or an input function without having a storage function such as the hard disk are used, and sources or data such as the application programs are collectively managed in the server. At the moment, various forms of thin clients have been proposed (for example, see Japanese Laid-Open Patent Publication (Kokai) No. 2003-333266).

However, if the conventional network scan function is directly applied to a server based computing environment such as a thin client environment, there has been a problem as described below.

Since all processes are performed via the server in the server based computing environment, the server receives a reading instruction from the client computer and causes the scanner to perform reading. Then image data obtained by reading the original by the scanner is sent to the server, and is further sent from the server to the client computer.

In this way, in the server based computing environment, the server intervenes in all of a series of processes, which imposes a significantly high load on the server. Moreover, it may take time for the client computer to display the image read by the scanner.

SUMMARY OF THE INVENTION

The present invention provides an image input/output system which makes it possible to reduce a load on a server in the case of using a network scan function in a server based computing environment, a control method of the image input/output system, and a program for implementing the control method.

In a first aspect of the present invention, there is provided an image input/output system in which an image reading device, a server, and a client device are communicably connected to one another via a network, and the server comprises a receiving unit adapted to receive a reading instruction from the client device, and an instruction unit adapted to instruct the image reading device to read an original according to the reading instruction received at the receiving unit, and the image reading device comprises a reading unit adapted to read the original based on the instruction from the instruction unit, and a sending unit adapted to send image data read by the reading unit to the client device without going through the server.

According to the present invention, when the client device receives the image data obtained by causing the image reading unit to read the original via the server according to the instruction from the client device, the image data obtained by reading the original by the image reading unit is sent to the client device without going through the server, which can reduce the load on the server.

Further features of the present invention will become apparent from the following detailed description of exemplary embodiments with reference to the attached drawings.

DETAILED DESCRIPTION OF THE PREFERRED EMBODIMENTS

The present invention will now be described in detail with reference to the drawings showing a preferred embodiment thereof.

Figure 1:
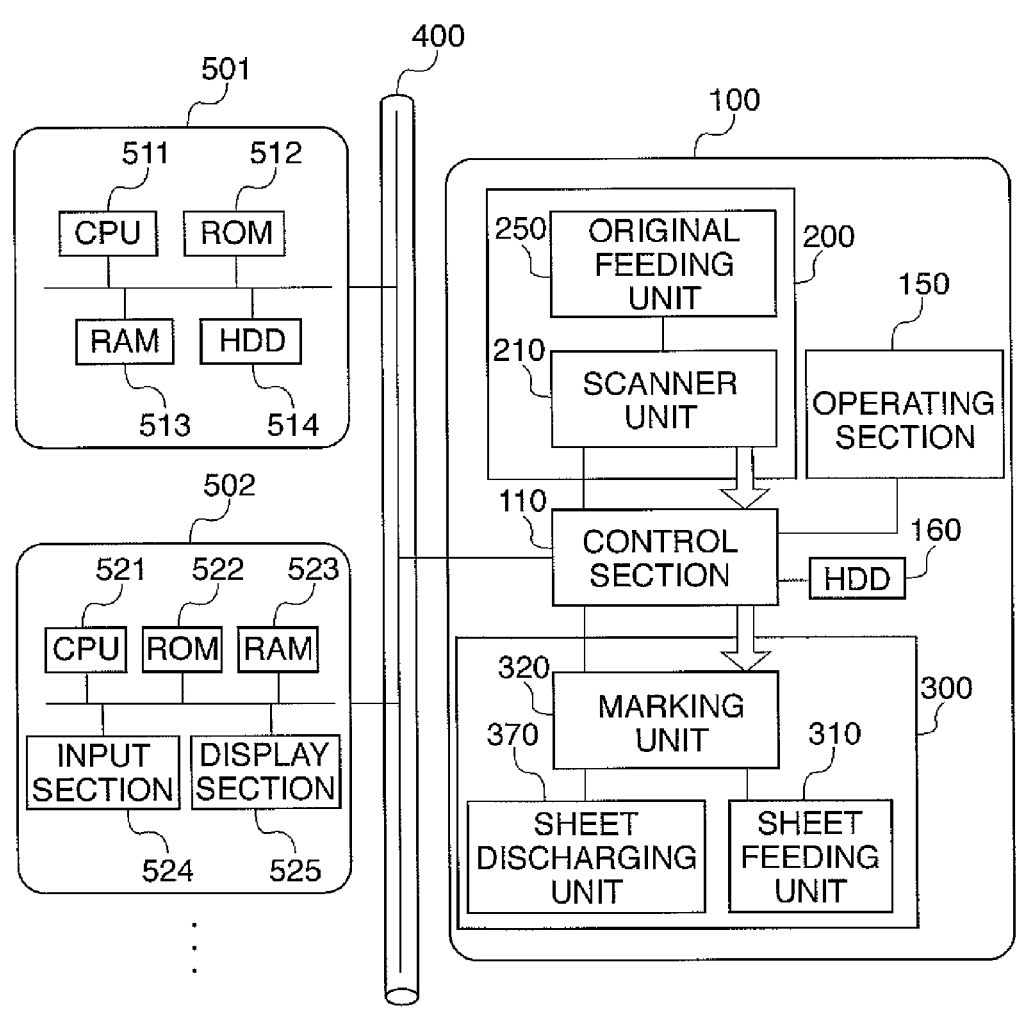
FIG. 1 is a block diagram schematically showing an overall configuration of an image input/output system according to an embodiment of the present invention.

FIG. 1 is a block diagram schematically showing an overall configuration of an image input/output system according to an embodiment of the present invention.

In FIG. 1, the image input/output system is a system having a network scan function, in which a multifunction peripheral 100, a server 501, and multiple computers (PCs) 502 . . . are communicably connected via a network (LAN) 400. Moreover, this system is a server based computing system in which the server 501 manages processes of thin client PCs. The multifunction peripheral 100 is provided with a control section 110, an operating section 150, an HDD (hard disk drive) 160, a reader section (image input section) 200 and a printer section (image output section) 300. A use environment of the network scan function will be described later with reference to FIG. 5.

The reader section 200 optically reads an image from an original and converts the image into image data, and is comprised of a scanner unit 210 and an original feeding unit 250. The scanner unit 210 has a function for reading the image from the original. The original feeding unit 250 has a function for conveying the original to a reading position and also ejecting the original which has been completely read, to an ejection tray.

The printer section 300 conveys a sheet, prints the image data as a visible image on the sheet, and then ejects the sheet out of the multifunction peripheral, and is comprised of a sheet feeding unit 310, a marking unit 320 and a sheet discharging unit 370. The sheet feeding unit 310 is provided with multiple types of sheet cassettes and has a function for feeding the sheet within the corresponding sheet cassette to a transfer position. The marking unit 320 has a function for transferring and fixing the image data onto the sheet. The sheet discharging unit 370 has a function for performing post processing (a sorting process, a stapling process and the like) on the sheet on which the print has been completed, and then discharging the sheet out of the multifunction peripheral.

The control section 110 is electrically connected to the reader section 200 and the printer section 300, and also communicably connected to the server 501 and the PC 502 via the network 400. The control section 110 provides a copy function for reading the image data from the original by the reader section 200, and printing the image data on the sheet by the printer section 300.

Moreover, the control section 110 provides a scanner function for converting the image data read from the original by the reader section 200 into code data, and sending the code data to the PC 502 via the network 400. Moreover, the control section 110 provides a printer function for converting the code data received from the PC 502 via the network 400 into the image data, and printing the image data by the printer section 300.

The operating section 150 is connected to the control section 110, and is provided with a liquid crystal display section, a touch panel input section and the like. The operating section 150 provides a user interface (hereinafter referred to as I/F) for operating the image input/output system. Details of the operating section 150 will be described later with reference to FIG. 3. The HDD 160 is an external storage device which writes/reads the image data with respect to a hard disk, as described later with respect to FIG. 3.

The server 501 is provided with a CPU 511 for controlling the respective sections in the server, a ROM 512 for storing programs, a RAM 513 for temporarily storing the data, and a mass storage device (HDD) 514. The server 501 is configured to be accessible from the PCs 502 to 504 (see FIG. 5) connected to the network 400, and stores shared documents or shared images in the HDD 514, as a shared file server.

Moreover, in order to manage the processes of the thin client PCs, the server 501 retains identification information on the thin client PCs, information on users using it, application software and driver software to be operated on the thin client PCs, and the like, in the HDD 514. The CPU 511 executes processes on the server side in the respective flowcharts described later, based on the programs.

The PC 502 is provided with a CPU 521 for controlling the respective sections in the PC, a ROM 522 for storing the programs, a RAM 523 for temporarily storing the data, an input section (keyboard and mouse) 524 for performing data input or instruction, and a display section (display) 525 for displaying the image. Since other PCs connected to the network 400 have similar configurations, they are not shown and descriptions thereof are omitted. The CPU 521 executes processes on the PC side in the respective flowcharts described later, based on the programs.

Figure 2:
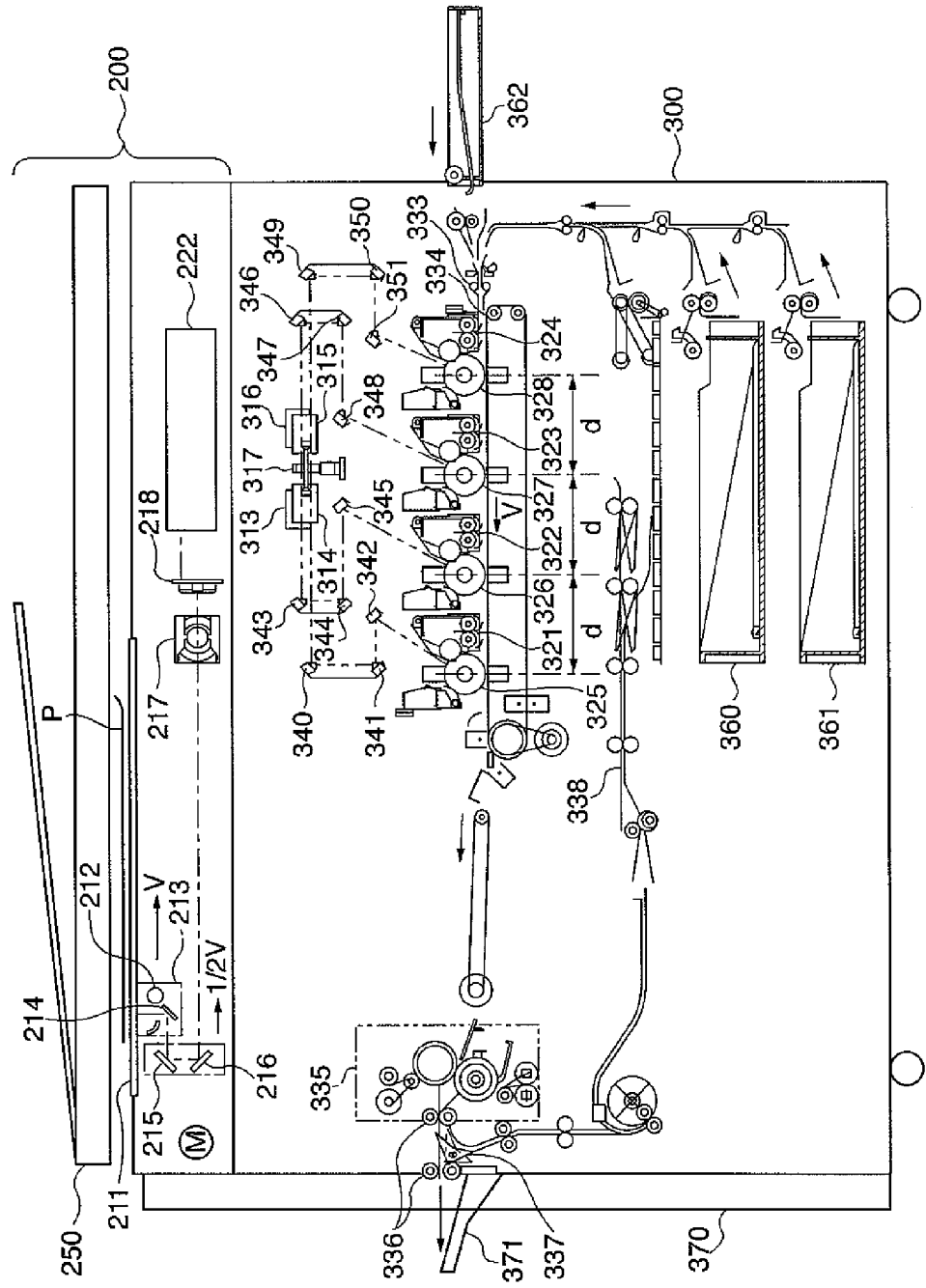
FIG. 2 is a diagram showing a schematic configuration of a reader section and a printer section of a multifunction peripheral.

FIG. 2 is a diagram showing a schematic configuration of the reader section 200 and the printer section 300 of the multifunction peripheral 100.

In FIG. 2, in the reader section 200, the original feeding unit 250 feeds each page of an original P in sequence from a first page onto a platen glass 211, and after an operation of reading the original P is completed, discharges the original on the platen glass 211. When the original P is conveyed onto the platen glass 211, a lamp 212 within an optical unit 213 is turned on, and movement of the optical unit 213 is started to expose and scan the original P.

A reflected light from the original P is imaged to a CCD image sensor (hereinafter referred to as CCD) 218 by mirrors 214, 215 and 216, and a lens 217. The CCD 218 photoelectrically converts the reflected light (optical image) of the imaged original P into an electrical signal. The image data outputted from the CCD 218 is subjected to a predetermined process, and then transferred to the control section 110. An image processing circuit section 222 processes the image data read from the original P as the electrical signal, and outputs it as a print signal to the printer section 300.

In the printer section 300, a laser driver 317 drives laser light emitting sections 313 to 316, and causes the laser light emitting sections 313 to 316 to emit laser lights depending on the image data outputted from the control section 110. The laser lights are illuminated on photosensitive drums 325 to 328 via mirrors 340 to 351, respectively. Latent images depending on the laser lights are formed on the photosensitive drums 325 to 328, respectively. Developing devices 321 to 324 develop the latent images on the photosensitive drums 325 to 328 with toners of black (Bk), yellow (Y), cyan (C) and magenta (M), respectively. The developed toners of the respective colors are transferred on the sheet, and full color print output is performed.

The sheet is fed from any of sheet cassettes 360 and 361 and a manual feeding tray 362, absorbed onto a transfer belt 334 via a resist roller 333, and conveyed. In this case, the sheet is fed and conveyed at a timing synchronized with start of the laser light illumination. Toner images attached to the photosensitive drums 325 to 328 are transferred onto the sheet. The sheet on which the toner images have been formed is conveyed to a fixing section 335, and the toners are fixed with heat and pressure of the fixing section 335. The sheet which has passed through the fixing section 335 is discharged to the sheet discharging unit 370 by a discharge roller 336. The sheet discharging unit 370 performs the post processes (a sorting process of bundling the sheets, a stapling process of stapling the sorted sheets and the like) with respect to the discharged sheet.

If double-sided recording for forming images on both sides of the sheet is set, after the sheet in which the toner image has been completely transferred and fixed on one side is conveyed to a position of the discharge roller 336, a rotation direction of the discharge roller 336 is reversed, and the sheet is guided to a sheet refeeding conveying path 338 by a flapper 337. The sheet guided to the sheet refeeding conveying path 338 is fed to the transfer belt 334 at the above described timing. The toner image is transferred on the other side on the sheet while being conveyed by the transfer belt 334, fixed by the fixing section 335, and then the sheet is discharged.

Figure 3:
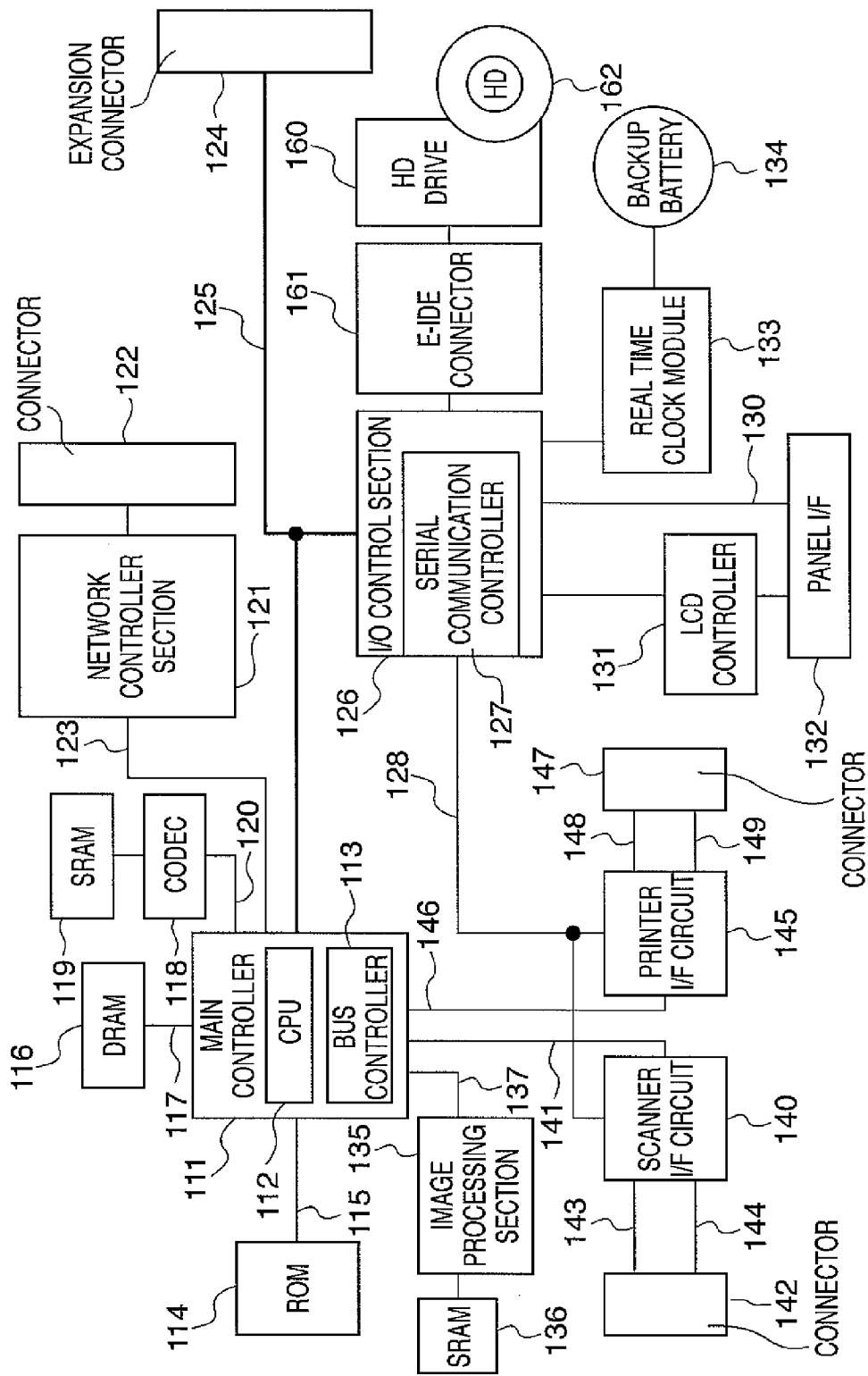
FIG. 3 is a block diagram showing a configuration of the multifunction peripheral with a central focus on a control section.

FIG. 3 is a block diagram showing a configuration of the multifunction peripheral 100 with a central focus on the control section 110.

In FIG. 3, the control section 110 is provided with a main controller 111, a network controller section 121, an I/O control section 126, an image processing section 135, a scanner I/F circuit 140, a printer I/F circuit 145 and the like.

The main controller 111 is configured mainly with a CPU 112, a bus controller 113, and various I/F controller circuits. The CPU 112 and the bus controller 113 control overall operations of the control section 110. The CPU 112 operates based on a program read from a ROM 114 via a ROM I/F 115. An operation for interpreting PDL (Page Description Language) code data received from a host computer and expanding the data into raster image data is also described in the program, which is processed by software. The bus controller 113 controls data transfer inputted and outputted via each I/F, and controls arbitration when there is a bus conflict or DMA (Direct Memory Access) data transfer.

A DRAM 116 is connected to the main controller 111 via a DRAM I/F 117, and is used as a work area for operation of the CPU 112 or a storage area for accumulating the image data.

A Codec (Coder Decoder) 118 compresses the raster image data accumulated in the DRAM 116 according to compression methods as described below, or conversely, expands the compressed and accumulated code data into the raster image data. The compression methods include MH (Modified Huffman), MR (Modified Read), MMR (Modified Modified Read), JBIG (Joint Bi-level Image Group), JPEG (Joint Photographic Experts Group) and the like.

The Codec 118 is connected to the main controller 111 via an I/F 120. The data transfer between the Codec 118 and the DRAM 116 is controlled by the bus controller 113 in the main controller 111, and is DMA transferred. An SRAM 119 is used as a temporary work area for the Codec 118.

The image processing section 135 performs processes of image rotation, image magnification changing, color space conversion, and image binarization, respectively with respect to the raster image data accumulated in the DRAM 116. Details of the image processing section 135 will be described later with reference to FIG. 4. An SRAM 136 is used as a temporary work area for the image processing section 135. The image processing section 135 is connected to the main controller 111 via an I/F 137, and the data transfer between the image processing section 135 and the DRAM 116 is controlled by the bus controller 113 and is DMA transferred.

The network controller section 121 is connected to the main controller 111 via an I/F 123, and connected to the external network (LAN) 400 via a connector 122. As the network 400, Ethernet (registered trademark) is generally given. An expansion connector 124 for connecting an expansion board and the I/O control section 126 are connected to a general purpose high speed bus 125. As the general purpose high speed bus 125, PCI (Peripheral Component Interconnect) bus is generally given.

The I/O control section 126 is connected to the scanner I/F circuit 140 and the printer I/F circuit 145 via an I/O bus 128. The I/O control section 126 is equipped with two channels of an asynchronous serial communication controller 127 for sending and receiving control commands between the CPU of the reader section 200 and the CPU of the printer section 300. A panel I/F 132 is connected to an LCD controller 131 and is provided with an I/F for performing display on a liquid crystal screen of the operating section 150, and a key input I/F 130 for inputting hard keys or touch panel keys.

The operating section 150 is provided with the liquid crystal display section, the touch panel input section attached on the liquid crystal display section, and multiple hard keys. The liquid crystal display section displays the functions related to the operations of the multifunction peripheral 100, the image data, or the like which are sent via the panel I/F 132. A signal inputted via the touch panel keys or the hard keys is communicated to the CPU 112 via the panel I/F 132.

A real time clock module 133 updates/stores date and time managed within the multifunction peripheral, and is backed up by a backup battery 134. An E-IDE (Enhanced Integrated Drive Electronics) connector 161 connects the external storage device. In the present embodiment, the HD drive 160 is connected to the I/O control section 126 via the E-IDE connector 161 to write/read the image data with respect to an HD 162.

A connector 142 is connected to the reader section 200, and is provided with an asynchronous serial I/F 143 and a video I/F 144. A connector 147 is connected to the printer section 300, and is provided with an asynchronous serial I/F 148 and a video I/F 149.

The scanner I/F circuit 140 is connected to the reader section 200 via the connector 142, and is also connected to the main controller 111 via a scanner bus 141. The scanner I/F circuit 140 has a function for applying the predetermined process to the image data received from the reader section 200. Furthermore, the scanner I/F circuit 140 also has a function for outputting a control signal generated based on a video control signal sent from the reader section 200, to the scanner bus 141. The data transfer from the scanner bus 141 to the DRAM 116 is controlled by the bus controller 113.

The printer I/F circuit 145 is connected to the printer section 300 via the connector 147, and is also connected to the main controller 111 via a printer bus 146. The printer I/F circuit 145 has a function for applying the predetermined process to the image data outputted from the main controller 111 and outputting the image data to the printer section 300. Furthermore, the printer I/F circuit 145 also has a function for outputting a control signal generated based on a video control signal sent from the printer section 300, to the printer bus 146. Under the control of the bus controller 113, the raster image data expanded on the DRAM 116 is DMA transferred to the printer section 300 via the printer bus 146 and the video I/F 149.

Figure 4:
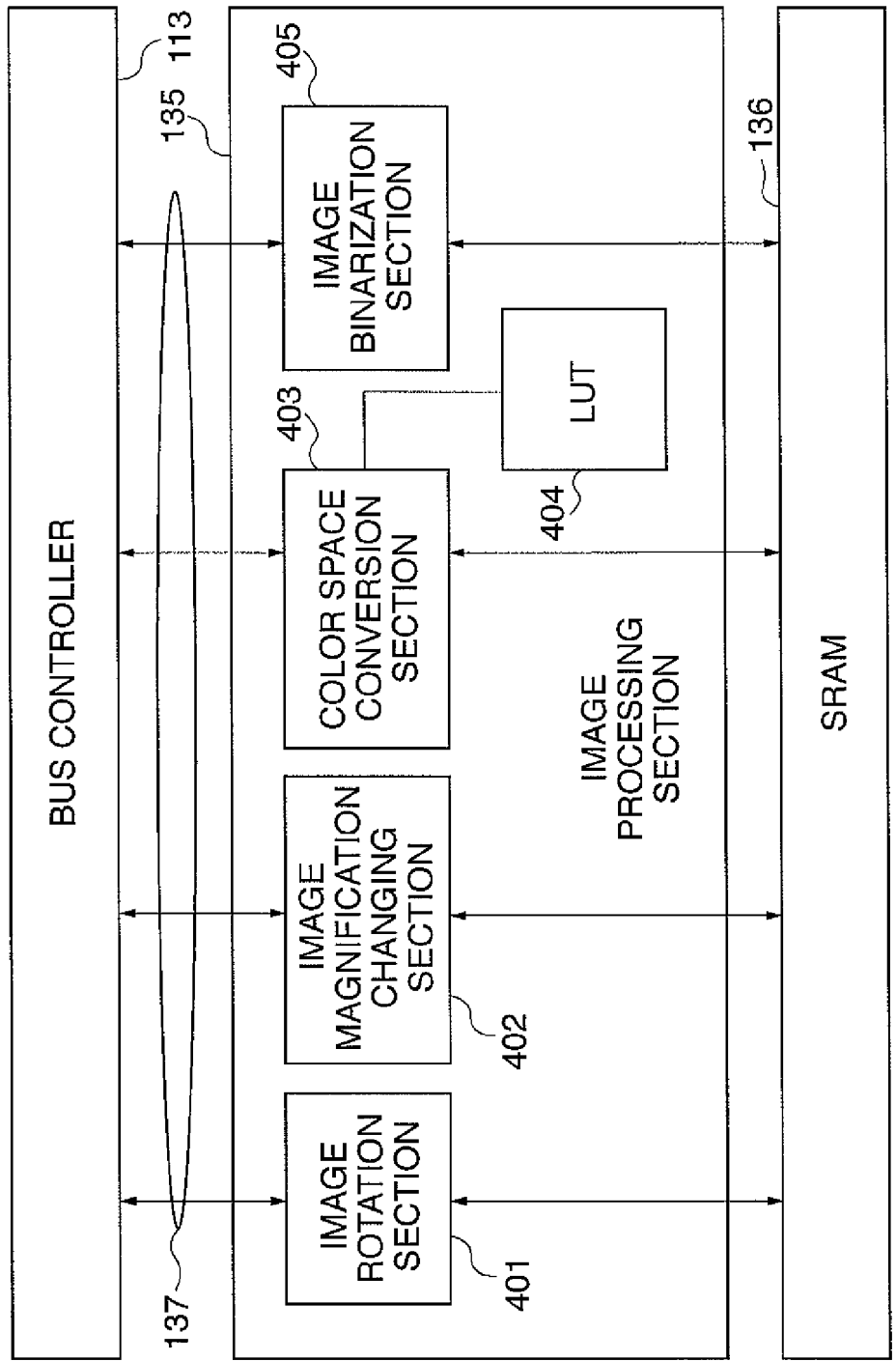
FIG. 4 is a block diagram showing a configuration of an image processing section of the multifunction peripheral.

FIG. 4 is a block diagram showing a configuration of the image processing section 135 of the multifunction peripheral 100.

In FIG. 4, the image processing section 135 is provided with an image rotation section 401, an image magnification changing section 402, a color space conversion section 403, a LUT (Look Up Table) 404 and an image binarization section 405. The SRAM 136 is used as temporary work areas for the respective modules in the image processing section 135. It is assumed that the work area has been statically assigned with each module in advance so that no conflict may occur in the work areas in the SRAM 136 which are used by the respective modules.

The image processing section 135 is connected to the main controller 111 via the I/F 137, and the data transfer between the image processing section 135 and the DRAM 116 is controlled by the bus controller 113 and is DMA transferred. The bus controller 113 controls to set modes and the like to the respective modules in the image processing section 135, and controls timing for transferring the image data to the respective modules. Hereinafter, the procedure of processing of the respective modules in the image processing section 135 will be described.

<Image Rotation Section>

Setting for controlling the image rotation is performed with respect to the bus controller 113 from the CPU 112 via the I/F 137. According to this setting, the bus controller 113 performs settings required for the image rotation (for example, an image size, rotation direction and angle, and the like) with respect to the image rotation section 401. After the necessary settings have been performed, the image data transfer is permitted with respect to the bus controller 113 again from the CPU 112. According to this permission, the bus controller 113 starts the image data transfer from the DRAM 116 or the device connected via each I/F.

<Image Magnification Changing Section>

Setting for controlling the image magnification changing is performed with respect to the bus controller 113 from the CPU 112 via the I/F 137. According to this setting, the bus controller 113 performs settings required for the image magnification changing (changed magnifications of main scanning direction/sub-scanning direction, the image size after the image magnification changing, and the like) with respect to the image magnification changing section 402. After the necessary settings have been performed, the image data transfer is permitted with respect to the bus controller 113 again from the CPU 112. According to this permission, the bus controller 113 starts the image data transfer from the DRAM 116 or the device connected via each I/F.

The image magnification changing section 402 temporarily stores the received image data in the SRAM 136, and uses the SRAM 136 as an input buffer to perform interpolation processes for the number of pixels and the number of lines required depending on the changed magnifications of main scanning direction/sub-scanning direction, with respect to the stored data, which is a magnification changing process. The image magnification changing section 402 writes the data subjected to the magnification changing, back into the SRAM 136 again, uses the SRAM 136 as an output buffer to read the image data from the SRAM 136 with the above described reading method, and transfers the image data to the bus controller 113. When the bus controller 113 receives the image data subjected to the magnification changing process, the bus controller 113 transfers the data to the DRAM 116 or each device on the I/F.

<Color Space Conversion Section>

Setting for controlling the color space conversion is performed with respect to the bus controller 113 from the CPU 112 via the I/F 137. According to this setting, the bus controller 113 performs settings required for a color space conversion process (coefficients for a matrix operation, a table value of the LUT 404 and the like, as described below) with respect to the color space conversion section 403 and the LUT 404. After the necessary settings have been performed, the image data transfer is permitted with respect to the bus controller 113 again from the CPU 112. According to this permission, the bus controller 113 starts the image data transfer from the DRAM 116 or the device connected via each I/F.

The color space conversion section 403 first applies a 3×3 matrix operation represented by the following formula, with respect to each one pixel of the received image data.

$$\begin{pmatrix} X \\ Y \\ Z \end{pmatrix} = \begin{pmatrix} a11 & a12 & a13 \\ a21 & a22 & a23 \\ a31 & a32 & a33 \end{pmatrix} \begin{pmatrix} R+b1 \\ G+b2 \\ B+b3 \end{pmatrix} + \begin{pmatrix} c1 \\ c2 \\ c3 \end{pmatrix} \quad \text{[Formula 1]}$$

In this formula, R, G and B are inputs, X, Y and Z are outputs, a11, a12, a13, a21, a22, a23, a31, a32, a33, b1, b2, b3, c1, c2, and c3 are the coefficients, respectively.

According to the operation of the above described formula, various color space conversions can be performed, such as conversion from an RGB color space into a YUV color space, for example. Moreover, black and white conversion can be performed by changing the coefficients. For example, the black and white conversion is performed by changing the coefficients so that the formula becomes a general formula such as (R+2G+B)/4. Next, conversion with the LUT 404 is performed with respect to the data subjected to the matrix operation. Thereby, a nonlinear conversion can also be performed. It is a matter of course that the LUT conversion may not be substantially performed by setting a table for passing through the conversion.

Subsequently, the color space conversion section 403 transfers the image data subjected to the color space conversion process to the bus controller 113. When the bus controller 113 receives the image data subjected to the color space conversion process, the bus controller 113 transfers the data to the DRAM 116 or each device on the I/F.

<Image Binarization Section>

Setting for controlling the binarization is performed with respect to the bus controller 113 from the CPU 112 via the I/F 137. According to this setting, the bus controller 113 performs settings required for the binarization process (various parameters depending on the conversion method, and the like) with respect to the image binarization section 405. After the necessary settings have been performed, the image data transfer is permitted with respect to the bus controller 113 again from the CPU 112. According to this permission, the bus controller 113 starts the image data transfer from the DRAM 116 or the device connected via each I/F.

The image binarization section 405 subjects the received image data to the binarization process. In the present embodiment, as a binarization method, the image data is compared with the predetermined threshold value and simply binarized. It is a matter of course that any method may be used such as a dither method, an error diffusion method and an improved error diffusion method.

Subsequently, the image binarization section 405 transfers the image data subjected to the binarization process to the bus controller 113. When the bus controller 113 receives the image data subjected to the binarization process, the bus controller 113 transfers the data to the DRAM 116 or each device on the I/F.

Figure 5:
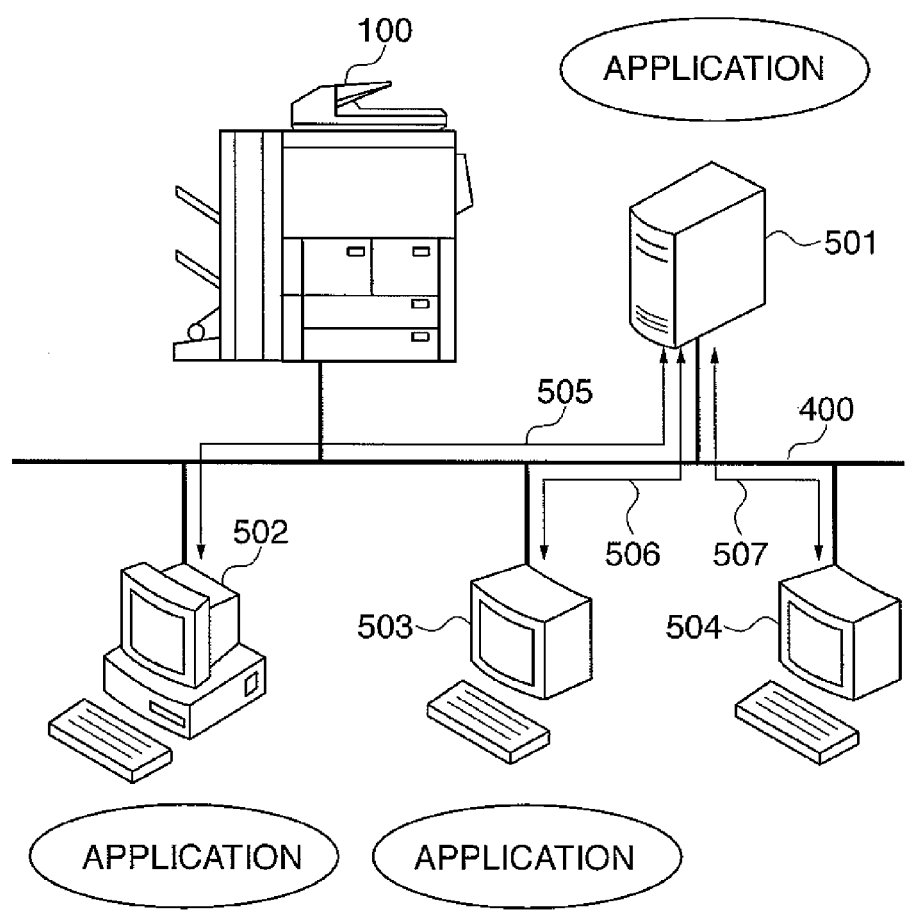
FIG. 5 is a diagram showing a use environment of a network scan function.

FIG. 5 is a diagram showing the use environment of the network scan function.

In FIG. 5, the multifunction peripheral 100, the server 501 and the PCs 502 to 504 are connected with the network via the LAN 400. The multifunction peripheral 100 is provided with a function for determining whether or not there is a nonvolatile mass storage in the PC, sending the image data to the PC if there is the mass storage in the PC, and sending the image data to the server 501 if there is no mass storage in the PC.

The server 501 is a server having the mass storage, and serves a role as a file server. Moreover, the server 501 is used as a server which executes an application program in a thin client environment.

The PC 502 is a host computer having the mass storage such as the HDD, and can execute normal processes without being managed by the server 501. The application program has been installed in the mass storage such as the HDD, and the PC 502 can also use the application program by itself. The PC 502 exchanges files with the server 501 and the like via the LAN 400 according to a communication method 505.

The PC 503 has no mass storage such as the HDD, however, the PC 503 is a thin client PC including many RAMs for operating the application program. Since the PC 503 has no mass storage, the PC 503 cannot use the application program by itself. However, since the PC 503 includes many RAMs, the PC 503 can operate the application program on the RAMs by loading the application program from the server 501, the multifunction peripheral 100 or the like.

The PC 503 exchanges the files or the application program with the server 501 and the like via the LAN 400 according to a communication method 506. However, the loaded application program is deleted after being completely processed, and it is necessary to download the application program again from the server 501 or the multifunction peripheral 100 if the application program is next used.

The PC 504 has no mass storage such as the HDD, and is a thin client PC including only minimum amounts of RAM. Since the PC 504 has the minimum amounts of RAM, the PC 504 cannot load and execute the application program, and can only perform key input and display output. Therefore, the PC 504 sends the input from the keyboard and the like to the server 501 via the LAN 400 according to a communication method 507, receives data to be displayed on the display from the server 501, and displays the data on the display. The application program is executed on the server 501.

In the present embodiment, although the use environment of the network scan function in which the PC including the HDD and two types of thin client PCs are mixed has been given as an example, the use environment of the network scan function is not limited thereto. Of course, the use environment of the network scan function which is configured with any one type of PC among the PC including the HDD and the thin client PCs is also assumed.

Figure 6:
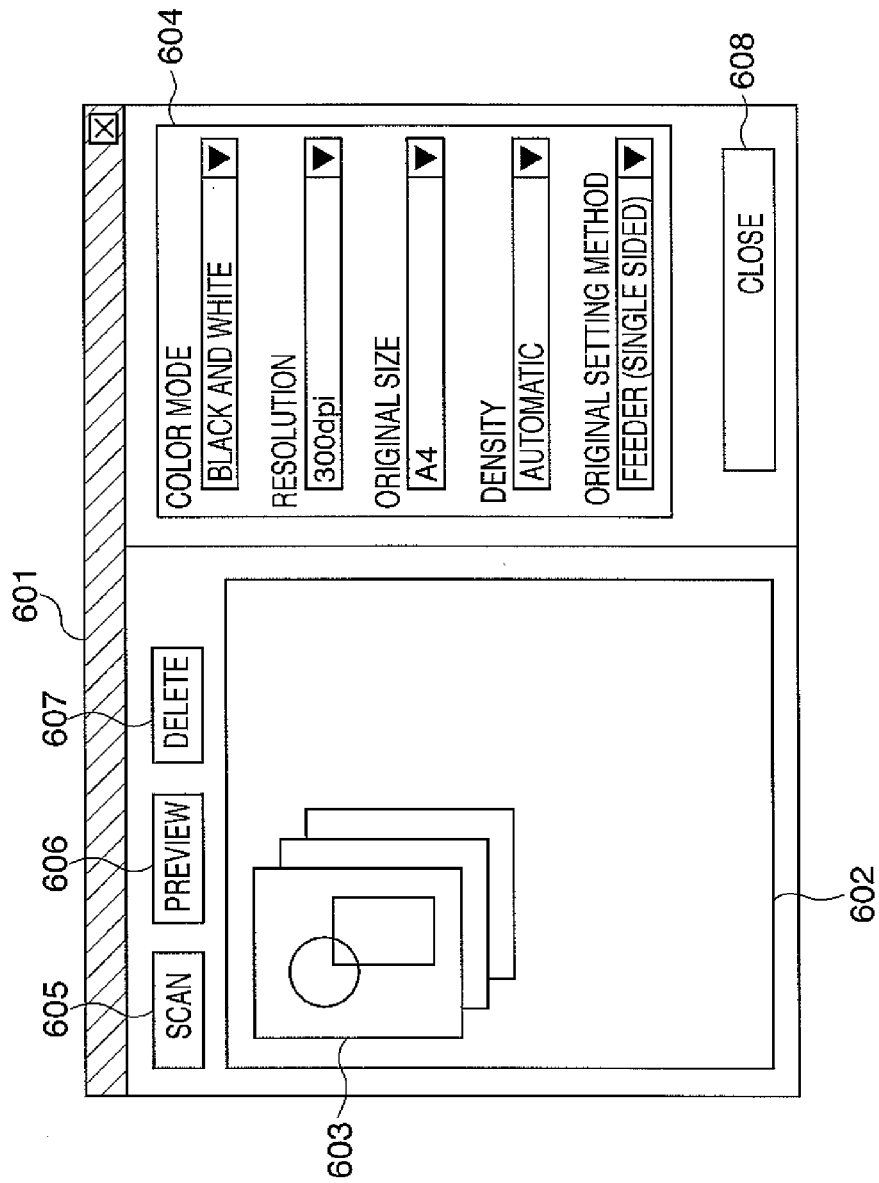
FIG. 6 is a diagram showing a display example by a scan driver on a PC in the network scan function.

FIG. 6 is a diagram showing a display example by network scan driver software (hereinafter abbreviated as "scan driver") on the PC in the network scan function.

In FIG. 6, a scan driver window 601 is displayed on the display of the PC. The network scan function is a function for instructing to scan with respect to the scanner unit 210 of the multifunction peripheral 100 from the scan driver of the PC, obtaining the scanned image via the network, and storing the image in the storage such as the HDD in the PC. It is also possible to set an image reading mode, or preview and select the image to be stored, from the scan driver of the PC.

A preview area 602 is an area for displaying thumbnail images 603 for previewing the scanned images. In the shown example, the thumbnail images 603 are displayed in an overlapped state. However, of course, the thumbnail images may be displayed in an arranged state. Various modes related to the scan can be set from a mode setting section 604. Information indicative of the modes set at the mode setting section 604 is sent from the PC to the multifunction peripheral 100. The multifunction peripheral 100 executes scanning in the set modes. In the present embodiment, a color mode, a reading resolution, an original size, a density, and an original setting method can be set.

When a Scan key 605 is depressed, the modes set at the mode setting section 604 and the scan instruction are sent from the PC via the network to the multifunction peripheral 100. The multifunction peripheral 100 starts the scan according to the scan instruction. A Preview key 606 is operated in a toggle manner. When the Preview key 606 is depressed and the preview is turned on, the thumbnail images are displayed in the preview area 602. When a Delete key 607 is depressed and the thumbnail image displayed in the preview area 602 is selected, the thumbnail image is deleted from the preview area 602 and an actual image is also deleted. As a result of the scan, if there is an image which is not required to be stored, the Delete key 607 is used.

A Close key 608 is used when the scan driver is terminated on the PC. When the Close key 608 is depressed, the scan driver window 601 is closed and also the image obtained by the scan at the multifunction peripheral 100 is stored in the PC. It is a matter of course that the system may be implemented to cause the user to select whether or not the image is stored, by displaying a window for inputting whether or not the image is stored, after the Close key 608 is depressed.

Next, operations in the image input/output system of the present embodiment having the above described configuration will be described in detail with reference to flowcharts of FIGS. 7 to 13 and FIGS. 14 to 20.

Figure 7:
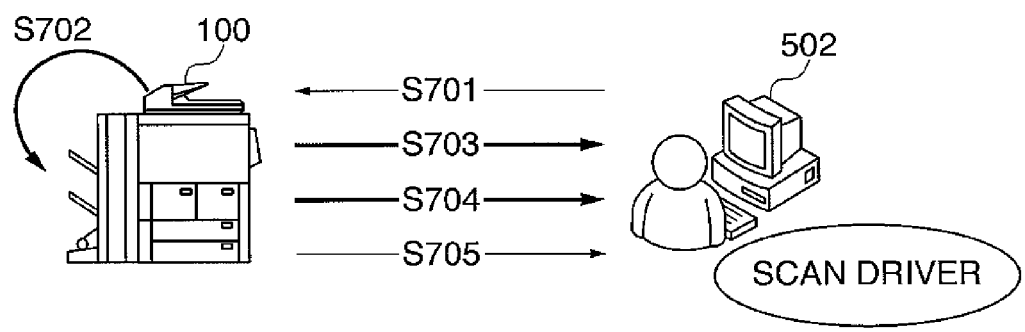
FIG. 7 is a diagram showing an operation in the case of creating a thumbnail at the multifunction peripheral side by a network scan operation in a conventional client/server environment.
Figure 14A:
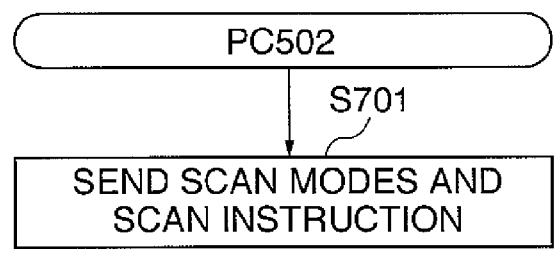
FIGS. 14A and 14B are flowcharts showing the operation of FIG. 7, respectively.
Figure 14B:
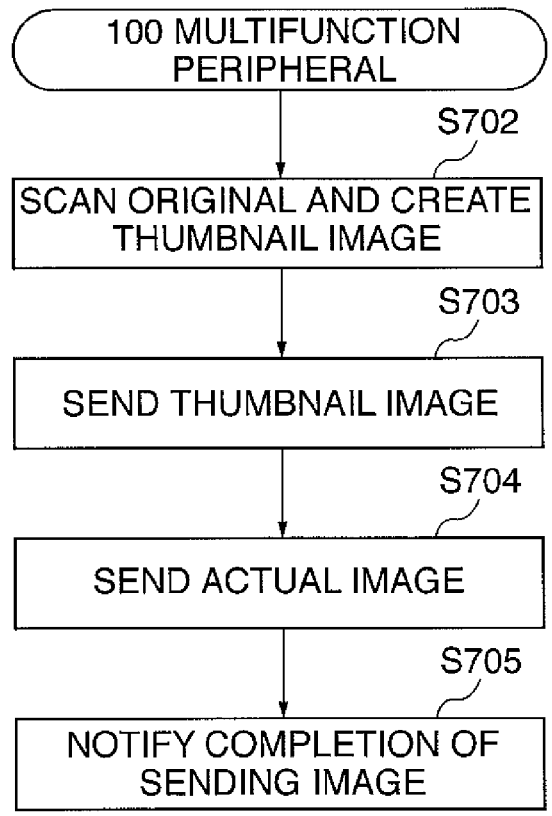

FIG. 7 is a diagram showing an operation in the case of creating the thumbnail (preview image data) at the multifunction peripheral side by a network scan operation in a conventional client/server environment. FIGS. 14A and 14B are flowcharts showing the operation of FIG. 7, respectively.

In FIGS. 7, 14A, and 14B, the PC 502 sends the information showing the scan modes and the scan instruction to the multifunction peripheral 100 (step S701). After the multifunction peripheral 100 scans the original by the scanner unit 210, the multifunction peripheral 100 creates thumbnail image data by utilizing resolution conversion and the like to reduce the number of pixels from the scanned image data (step S702). In the present embodiment, the image data scanned from the original by the multifunction peripheral 100 is stored in the HD 162 once by the HOD 160. Next, the multifunction peripheral 100 sends the thumbnail image data to the PC 502 (step S703).

Next, the multifunction peripheral 100 sends actual image data (image data according to the scan modes such as the resolution and the like specified in the scan driver) to the PC 502 (step S704) Of course, the operation may be configured so that unnecessary thumbnail image data is deleted from the thumbnail image data received by the PC 502 from the multifunction peripheral 100 at the step S703, by the scan driver operating on the PC 502, and only necessary image data is sent at the step S704. After all image data has been completely sent, the multifunction peripheral 100 deletes the image data on the HDD of the multifunction peripheral 100, and notifies the PC 502 of the completion of sending the image data (step S705).

Figure 8:
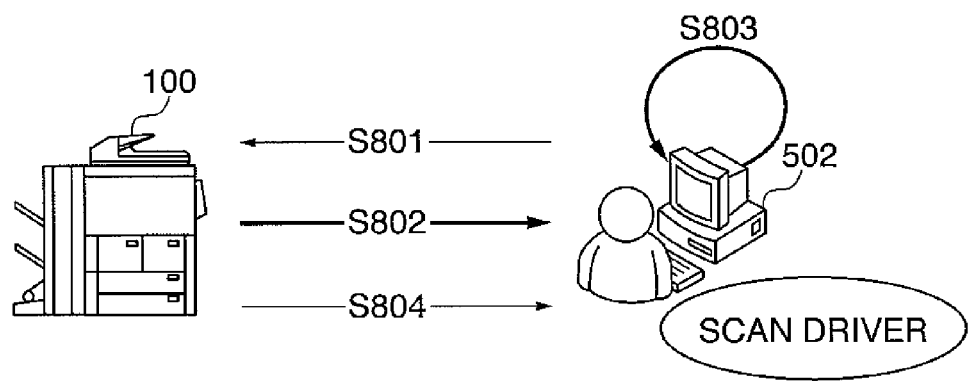
FIG. 8 is a diagram showing an operation in the case of creating the thumbnail at the PC side by the network scan operation in the conventional client/server environment.
Figure 15A:
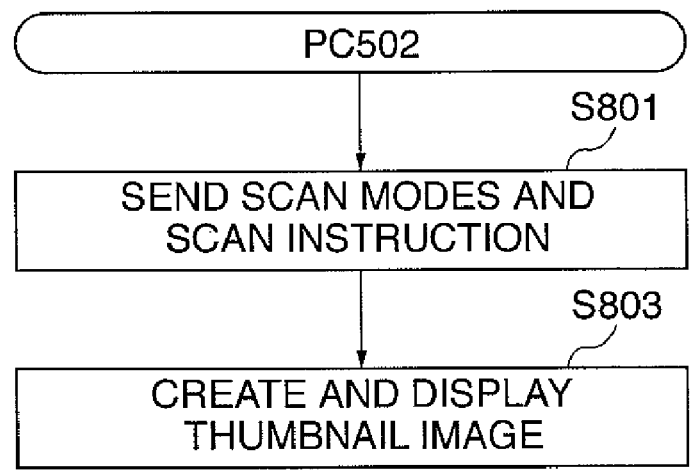
FIGS. 15A and 15B are flowcharts showing the operation of FIG. 8, respectively.
Figure 15B:
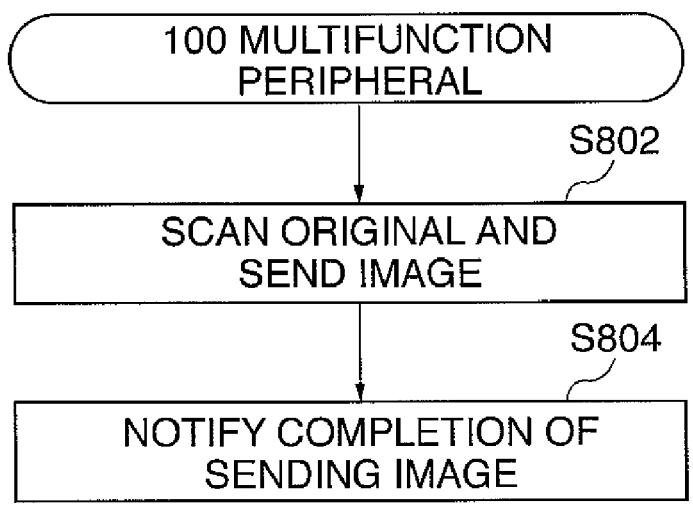

FIG. 8 is a diagram showing an operation in the case of creating the thumbnail at the PC side by the network scan operation in the conventional client/server environment. FIGS. 15A and 15B are flowcharts showing the operation of FIG. 8, respectively.

In FIGS. 8, 15A and 15B, the PC 502 sends the information showing the scan modes and the scan instruction to the multifunction peripheral 100 (step S801). After the multifunction peripheral 100 scans the original by the scanner unit 210, the multifunction peripheral 100 stores the scanned image data in the HD 162 by the HDD 160 and also sends the scanned image data to the PC 502 (step S802).

If the preview has been turned on in the setting in the scan driver, the PC 502 creates the thumbnail image data by applying the resolution conversion to the actual image data, and displays the thumbnail image data on the display (step S803). After all image data has been completely sent, the multifunction peripheral 100 deletes the image data on the HDD of the multifunction peripheral 100, and notifies the PC 502 of the completion of sending the image data (step S804).

Figure 9:
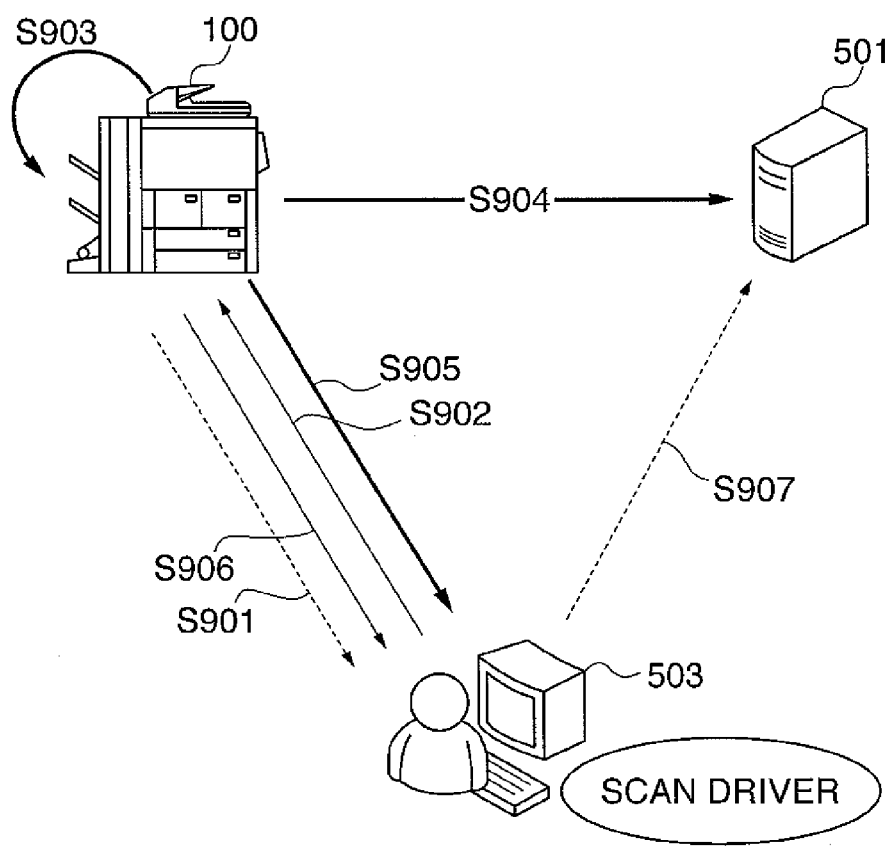
FIG. 9 is a diagram showing a first specific example of the network scan operation in a thin client environment.
Figure 16A:
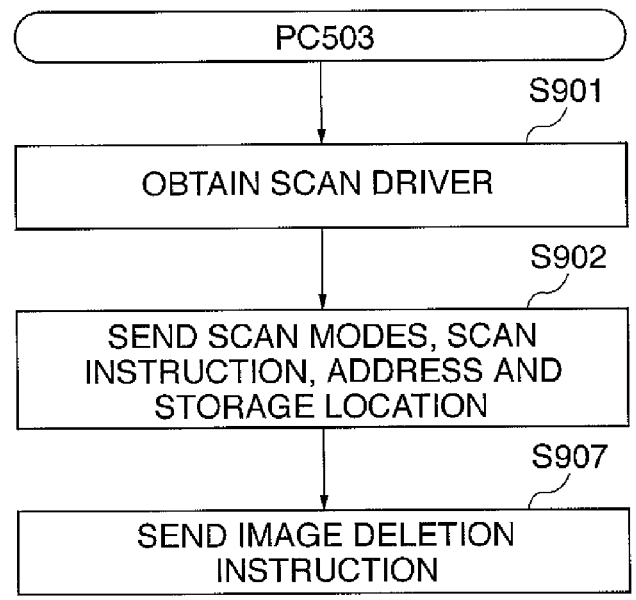
FIGS. 16A and 16B are flowcharts showing the operation of FIG. 9, respectively.
Figure 16B:
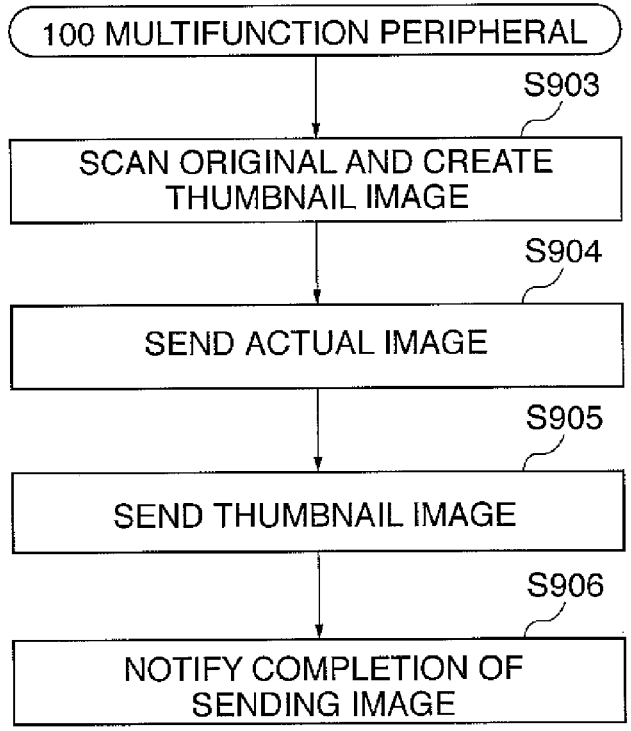

FIG. 9 is a diagram showing a first specific example of the network scan operation in the thin client environment. FIGS. 16A and 16B are flowcharts showing the operation of FIG. 9, respectively.

In FIGS. 9, 16A, and 16B, in the first specific example, the PC 503 includes no HDD, however includes the RAM capable of executing the application program. Therefore, the scan driver is operated on the PC 503 and the thumbnail image data is created at the multifunction peripheral 100.

First, the PC 503 accesses the multifunction peripheral 100, obtains the scan driver for the multifunction peripheral 100 from the multifunction peripheral 100 (step S901), and expands it on the RAM. In the present embodiment, although the scan driver is obtained from the multifunction peripheral 100, of course, the scan driver may be obtained from other devices such as the server 501. The PC 503 instructs the server 501 to send the following information to the multifunction peripheral 100. In other words, the PC 503 instructs the server 501 to send the scan modes, the scan instruction, address information on the PC 503 itself which has performed the instruction, address information on the server 501 to which the actual image data is sent, and information indicative of an image data storage location, to the multifunction peripheral 100 (step S902).

When the multifunction peripheral 100 receives the scan instruction from the PC 503 via the server 501, the multifunction peripheral 100 scans the original by the scanner unit 210, and then utilizes the resolution conversion and the like to create the thumbnail image data from the scanned image data (step S903). The multifunction peripheral 100 sends the actual image data to the server 501, according to the address information on the server 501 sent with the scan instruction (step S904). Simultaneously, the multifunction peripheral 100 sends the thumbnail image data to the PC 503 without going through the server 501, according to the address information on the PC 503 sent with the scan instruction (step S905).

The actual image data sent from the multifunction peripheral 100 to the server 501 at the step S904 is stored in the image data storage location in the server 501 (the area for the PC 503 or the area for the user who has performed the reading instruction by using the PC 503) specified at the step S902. Moreover, the thumbnail image data sent from the multifunction peripheral 100 to the PC 503 at the step S905 has been linked to the actual image data sent to the server 501. Thereby, based on the thumbnail image data, the actual image data stored in the image data storage location in the server 501 can be specified.

After all image data has been completely sent, the multifunction peripheral 100 deletes the image data on the HDD of the multifunction peripheral 100, and notifies the PC 503 of the completion of sending the image data (step S906). The user specifies the thumbnail image data received by the PC 503 from the multifunction peripheral 100 at the step S905, and performs a deletion instruction. Thereby, the PC 503 sends the image data deletion instruction to the server 501 (step S907). The server 501 deletes the actual image data liked to the specified thumbnail image data.

In other words, in the present embodiment, when the thumbnail image data is sent from the multifunction peripheral 100 to the PC 503, information on a storage destination of the actual image data is attached to the thumbnail image data. When the actual image data stored in the server 501 is deleted from the PC 503, the storage destination information attached to the thumbnail image data is referred to. Thereby, the actual image data stored in the server 501 and corresponding to the thumbnail image data can be deleted. At this time, since the thumbnail image data is sent to the PC 503 without going through the server 501, a load on the server 501 can be reduced and also the PC 503 can rapidly perform the preview.

Figure 10:
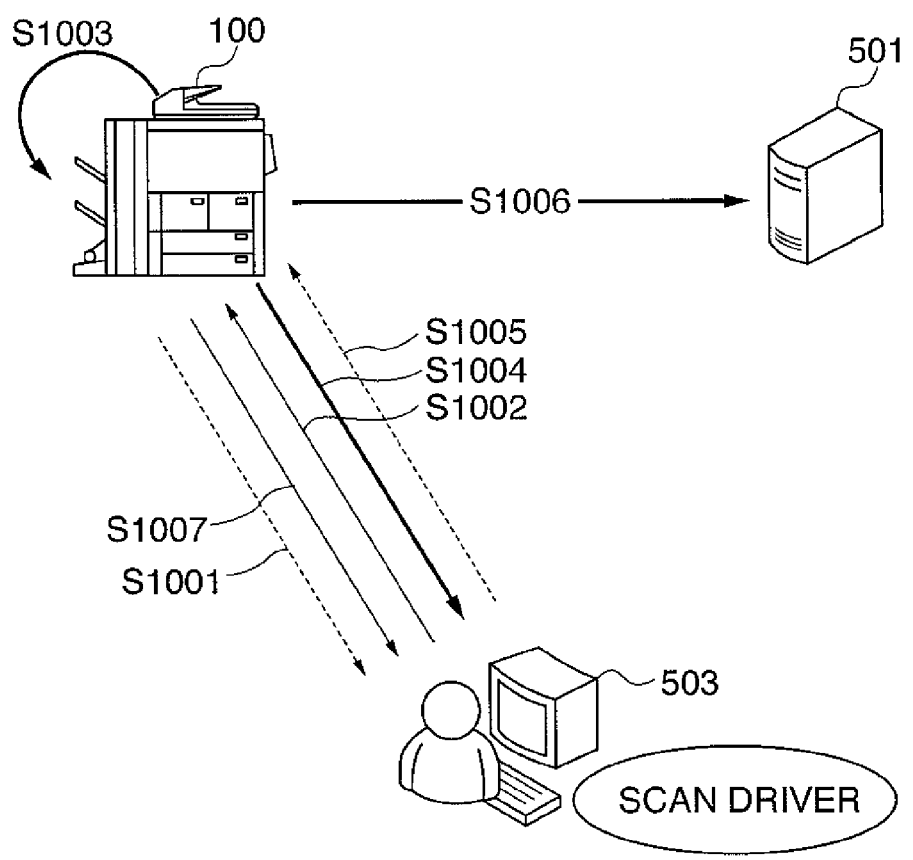
FIG. 10 is a diagram showing a second specific example of the network scan operation in the thin client environment.
Figure 17A:
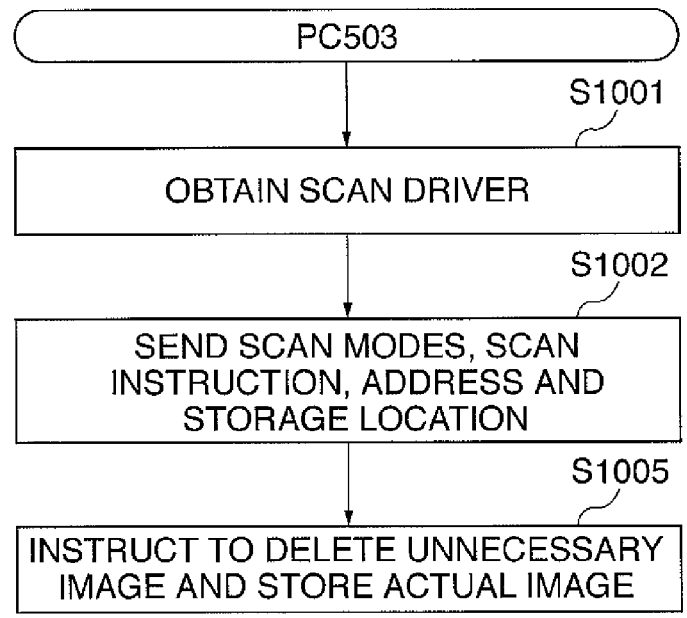
FIGS. 17A and 17B are flowcharts showing the operation of FIG. 10, respectively.
Figure 17B:
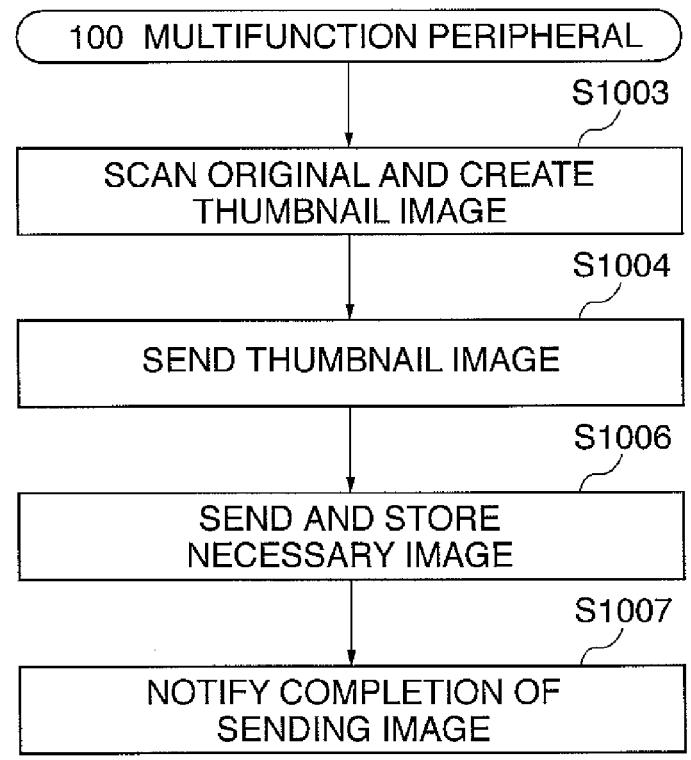

FIG. 10 is a diagram showing a second specific example of the network scan operation in the thin client environment. FIGS. 17A and 17B are flowcharts showing the operation of FIG. 10, respectively.

In FIGS. 10, 17A, and 17B, in the second specific example, the PC 503 includes no HDD, however includes the RAM capable of executing the application program. Therefore, the scan driver is operated on the PC 503 and the thumbnail image data is created at the multifunction peripheral 100.

First, the PC 503 accesses the multifunction peripheral 100, obtains the scan driver for the multifunction peripheral 100 from the multifunction peripheral 100 (step S1001), and expands it on the RAM. The PC 503 instructs the server 501 to send the following information to the multifunction peripheral 100. In other words, the PC 503 instructs the server 501 to send the scan modes, the scan instruction, the address information on the PC 503 itself which has performed the instruction, the address information on the server 501 to which the actual image data is sent, and the information showing the image data storage location, to the multifunction peripheral 100 (step S1002).

After the multifunction peripheral 100 scans the original by the scanner unit 210, the multifunction peripheral 100 utilizes the resolution conversion and the like to create the thumbnail image data from the scanned image data (step S1003). The multifunction peripheral 100 sends the thumbnail image data to the PC 503 without going through the server 501, according to the address information on the PC 503 sent with the scan instruction (step S1004).

The user refers to the thumbnail image data sent from the multifunction peripheral 100 at the step S1004 by obtaining it by the scan driver on the PC 503, and specifies unnecessary image data. Thereby, the PC 503 sends the deletion instruction for the unnecessary image data and an instruction to store the actual image data in the server 501, to the multifunction peripheral 100 (step S1005).

The multifunction peripheral 100 sends only necessary image data (the image data corresponding to the thumbnail image data selected at PC 503) to the server 501. Furthermore, the multifunction peripheral 100 stores the image data in the specified image data storage location in the server 501 (the area for the PC 503 or the area for the user who has performed the reading instruction by using the PC 503) (step S1006). After all image data has been completely sent, the multifunction peripheral 100 deletes the image data on the HDD of the multifunction peripheral 100, and notifies the PC 503 of the completion of sending the image data (step S1007).

Figure 11:
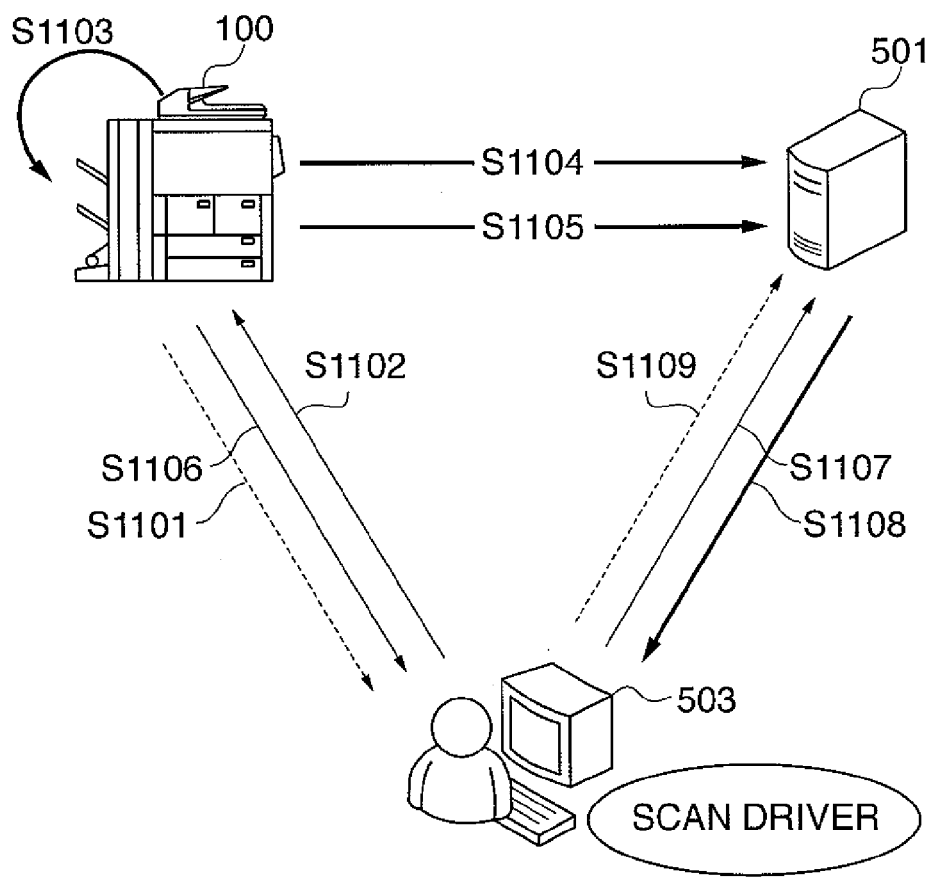
FIG. 11 is a diagram showing a third specific example of the network scan operation in the thin client environment.
Figure 18A:
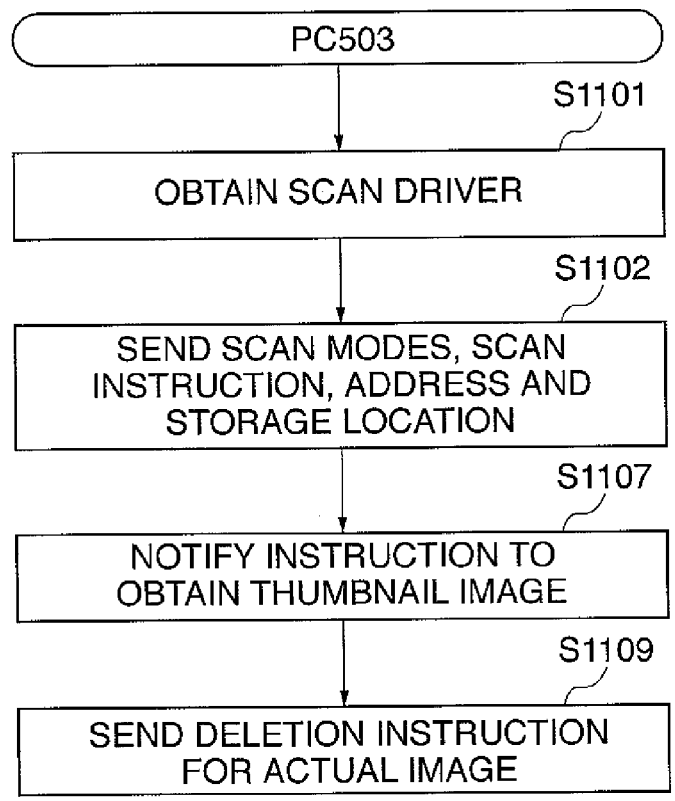
FIGS. 18A, 18B and 18C are flowcharts showing the operation of FIG. 11, respectively.
Figure 18B:
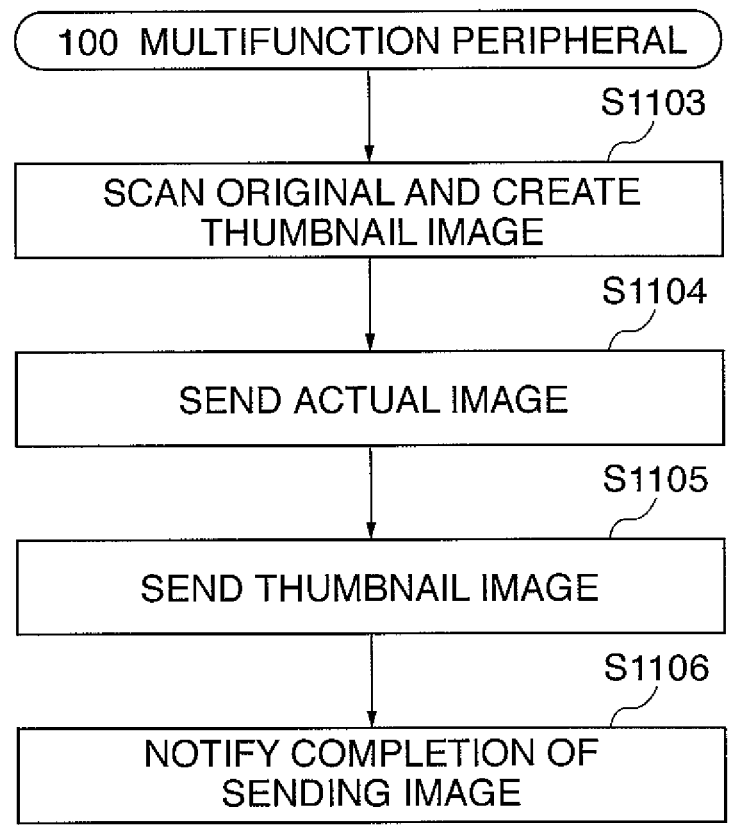
Figure 18C:
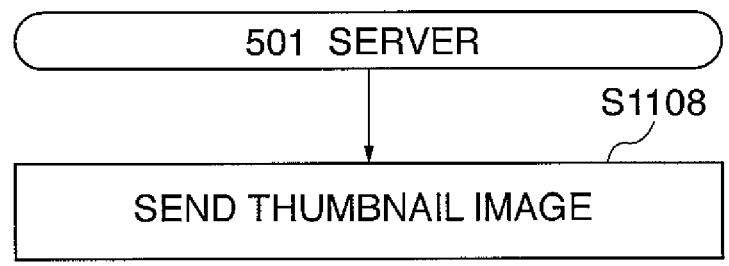

FIG. 11 is a diagram showing a third specific example of the network scan operation in the thin client environment. FIGS. 18A, 18B, and 18C are flowcharts showing the operation of FIG. 11, respectively.

In FIGS. 11, 18A, 18B, and 18C, in the third specific example, the PC 503 includes no HDD, however includes the RAM capable of executing the application program. Therefore, the scan driver is operated on the PC 503 and the thumbnail image data is created at the multifunction peripheral 100.

First, the PC 503 accesses the multifunction peripheral 100, obtains the scan driver for the multifunction peripheral 100 from the multifunction peripheral 100 (step S1101), and expands it on the RAM of the PC 503. The PC 503 sends the scan modes, the scan instruction, the address information on the server 501 to which the actual image data is sent, and the information showing the storage location, to the multifunction peripheral 100 (step S1102).

After the multifunction peripheral 100 scans the original by the scanner unit 210, the multifunction peripheral 100 utilizes the resolution conversion and the like to create the thumbnail image data from the scanned image data (step S1103). The multifunction peripheral 100 sends the actual image data to the server 501 (step S1104), and also sends the thumbnail image data to the server 501 (step S1105). After all image data has been completely sent, the multifunction peripheral 100 deletes the image data on the HDD of the multifunction peripheral 100, and notifies the PC 503 of the completion of sending the image data (step S1106).

The user performs a preview instruction from the scan driver. Thereby, the PC 503 notifies the server 501 of an instruction to obtain the thumbnail image data (step S1107). The server 501 sends the thumbnail image data to the PC 503 (step S1108). Information on the link with the actual image data has been attached to the thumbnail image data sent from the server 501 to the PC 503 at the step S1108. The user selects the thumbnail image data on the scan driver on the PC 503 and performs the deletion instruction. Thereby, the PC 503 sends the deletion instruction for the actual image data to the server 501 (step S1109). The server 501 deletes the actual image data.

Figure 12:
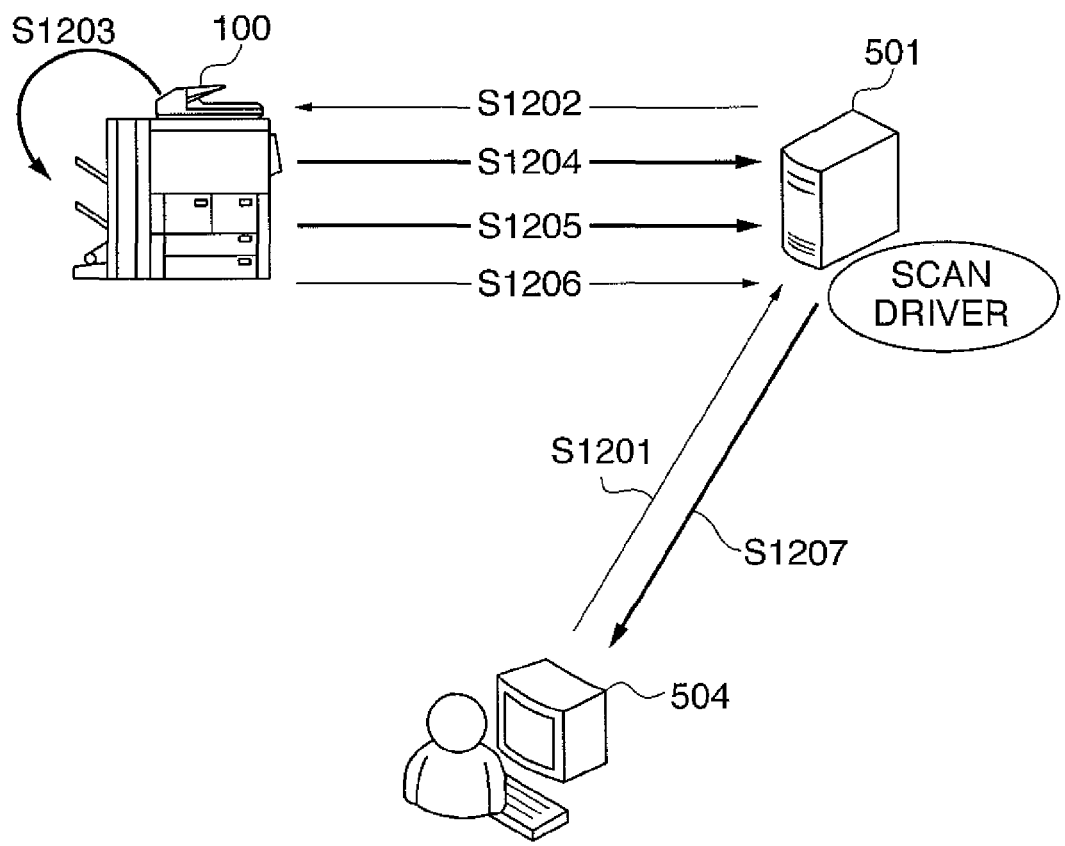
FIG. 12 is a diagram showing a fourth specific example of the network scan operation in the thin client environment.
Figure 19A:
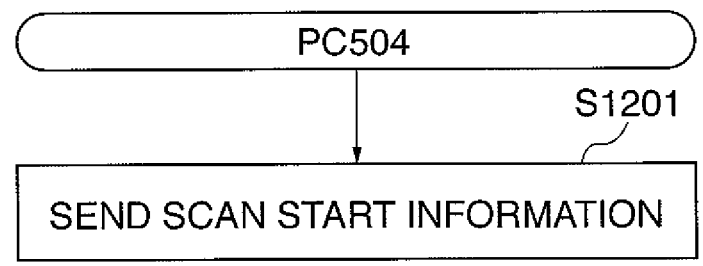
FIGS. 19A, 19B and 19C are flowcharts showing the operation of FIG. 12, respectively.
Figure 19B:
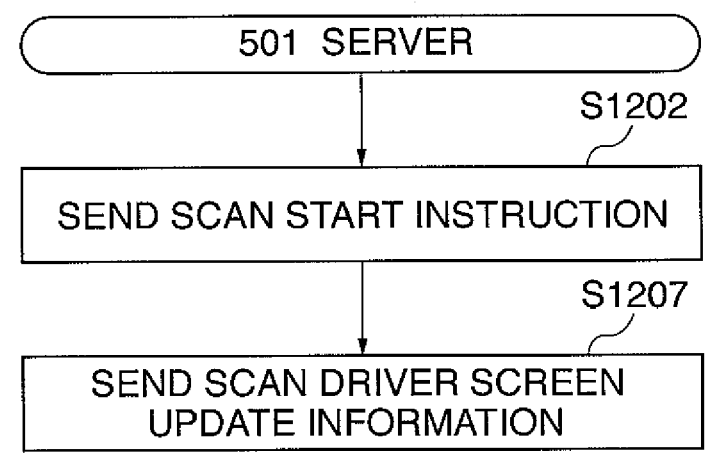
Figure 19C:
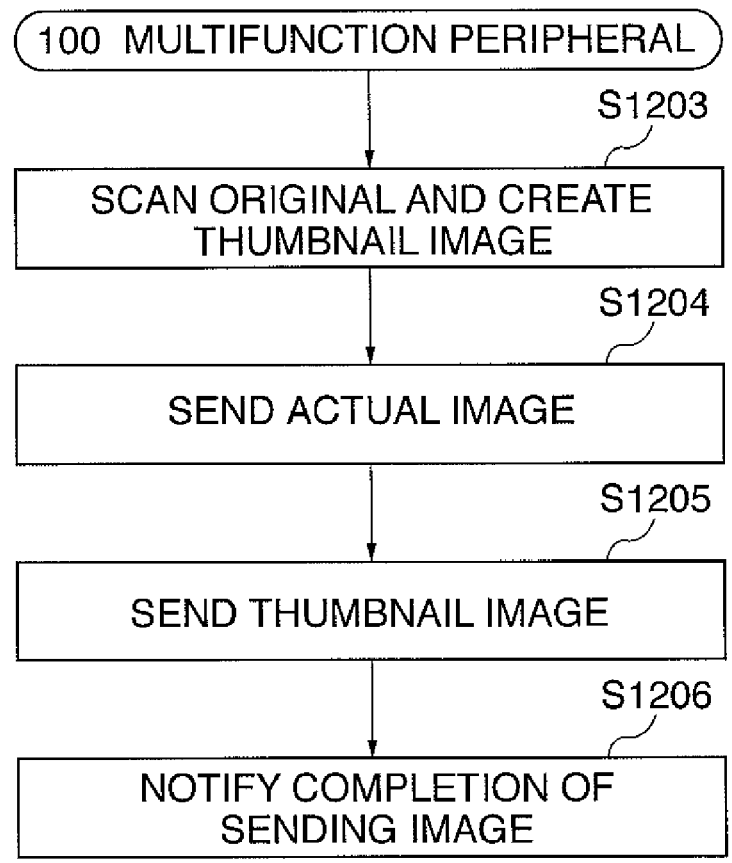

FIG. 12 is a diagram showing a fourth specific example of the network scan operation in the thin client environment. FIGS. 19A, 19B and 19C are flowcharts showing the operation of FIG. 12, respectively.

In FIGS. 12, 19A, 19B and 19C, in the fourth specific example, the PC 504 includes no HDD and includes only the minimum amounts of RAM. Therefore, the PC 504 is just an input/output terminal, and the scan driver is operated on the server 501.

The input by the user from the input section such as the keyboard or the mouse in the PC 504 is directly sent to the server 501. The input from the PC 504 starts the scan driver on the server 501, and a scan driver screen is displayed on the display of the PC 504. The user performs a scan start operation on the scan driver screen of the PC 504. Thereby, the PC 504 sends information corresponding to coordinates on the scan driver screen indicated with the mouse and the operation of the keyboard, to the server 501 (step S1201). The server 501 recognizes the scan start operation, and sends a scan start instruction to the multifunction peripheral 100 (step S1202).

After the multifunction peripheral 100 scans the original by the scanner unit 210, the multifunction peripheral 100 utilizes the resolution conversion and the like to create the thumbnail image data from the scanned image data (step S1203). The multifunction peripheral 100 sends the actual image data to the server 501 (step S1204), and also sends the thumbnail image data to the server 501 (step S1205). After all image data has been completely sent, the multifunction peripheral 100 deletes the image data on the HDD of the multifunction peripheral 100, and notifies the server 501 of the completion of sending the image data (step S1206).

Depending on the operation from the step S1202 to the step S1206, the server 501 updates the display on the scan driver screen of the PC 504. The server 501 sends information indicative of the update of the scan driver screen to the PC 504 (step S1207). Thereby, the updated scan driver screen is displayed on the display of the PC 504. The user can operate the scan driver on the server 501 by the input section of the PC 504, and can delete the actual image data and the like if necessary.

Figure 13:
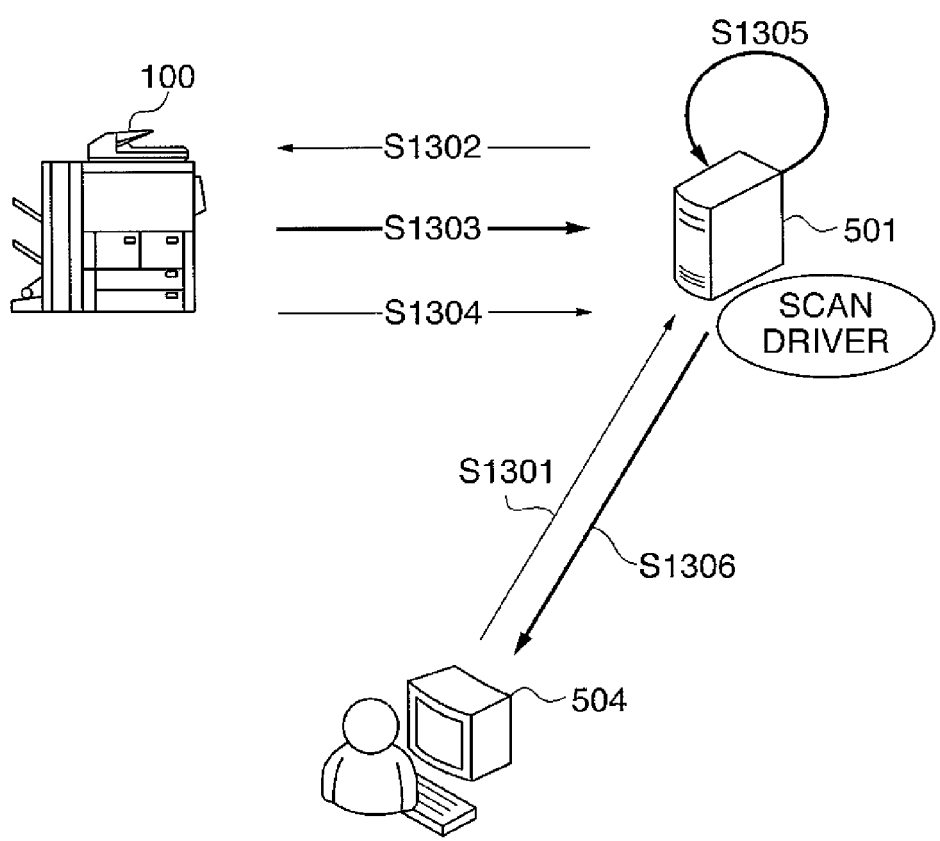
FIG. 13 is a diagram showing a fifth specific example of the network scan operation in the thin client environment.
Figure 20A:
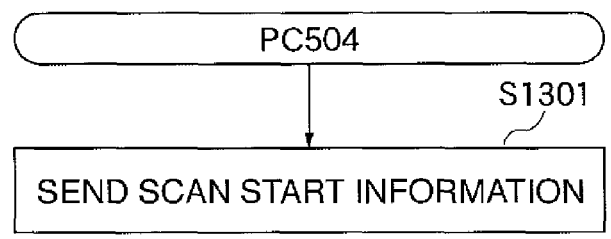
FIGS. 20A, 20B and 20C are flowcharts showing the operation of FIG. 13, respectively.
Figure 20B:
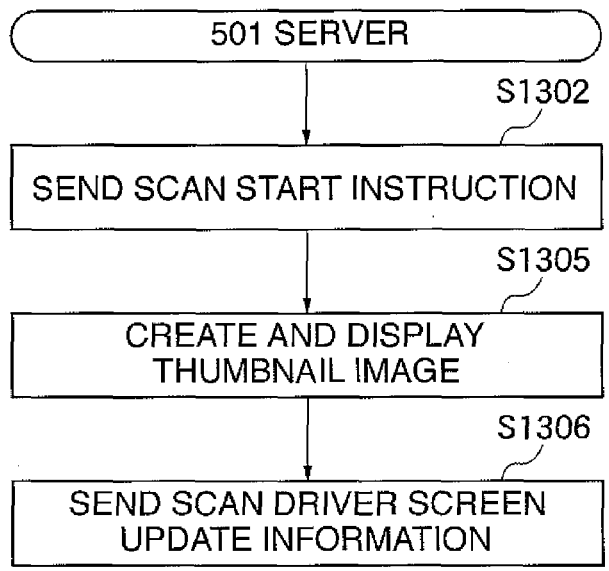
Figure 20C:
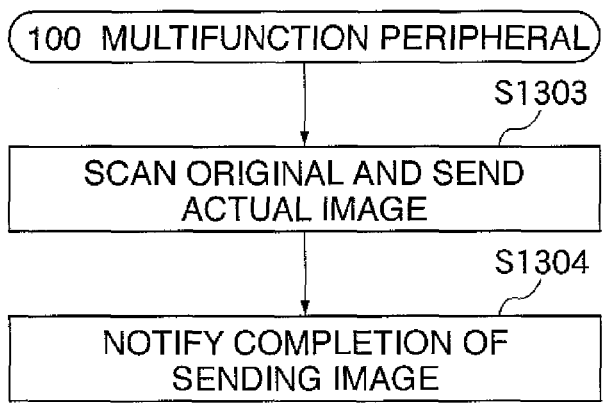

FIG. 13 is a diagram showing a fifth specific example of the network scan operation in the thin client environment. FIGS. 20A, 20B and 20C are flowcharts showing the operation of FIG. 13, respectively.

In FIGS. 13, 20A, 20B and 20C, in the fifth specific example, the PC 504 includes no HDD and includes only the minimum amounts of RAM. Therefore, the PC 504 is just the input/output terminal, and the scan driver is operated on the server 501.

The input by the user from the input section such as the keyboard or the mouse of the PC 504 is directly sent to the server 501. The input from the PC 504 starts the scan driver on the server 501, and the scan driver screen is displayed on the display of the PC 504. The user performs the scan start operation on the scan driver screen of the PC 504. Thereby, the PC 504 sends the information corresponding to the coordinates on the scan driver screen indicated with the mouse and the operation of the keyboard, to the server 501 (step S1301). The server 501 recognizes the scan start operation, and sends the scan start instruction to the multifunction peripheral 100 (step S1302).

After the multifunction peripheral 100 scans the original by the scanner unit 210, the multifunction peripheral 100 sends the actual image data to the server 501 (step S1303). After all image data has been completely sent, the multifunction peripheral 100 deletes the image data on the HDD of the multifunction peripheral 100, and notifies the server 501 of the completion of sending the image data (step S1304). The user instructs the preview by the scan driver of the server 501. Thereby, the scan driver of the server 501 creates the thumbnail image data from the actual image data by the resolution conversion on the server 501, and displays the thumbnail image data on the scan driver screen of the PC 504 (step S1305).

Depending on the operation from step S1302 to step S1305, the server 501 updates the display on the scan driver screen of the PC 504. The server 501 sends the information showing the update of the scan driver screen to the PC 504 (step S1306). Thereby, the updated scan driver screen is displayed on the display of the PC 504. The user can operate the scan driver on the server 501 by the input section of the PC 504, and can delete the actual image data and the like if necessary.

It should be noted that, although the specific examples of the network scan function have been described with reference to FIGS. 7 to 13 in the present embodiment, since various use environments may be mixed as shown in FIG. 5, the network scan function may be configured as follows. The network scan function may be configured so that the scan driver recognizes relationships between the client PCs and the server, and from statuses of resources such as the HDD and the RAM, it is automatically determined which pattern among FIGS. 7 to 13 the function operates in, and then the function operates.

As described above, according to the present embodiment, if the scan instruction is sent from the PC to the multifunction peripheral in the thin client environment, the actual image data is sent to the server and the thumbnail image data linked to the actual image data is sent to the PC. Alternatively, the thumbnail image data is sent to the server, the PC notifies the server of the instruction to obtain the thumbnail image data, and the thumbnail image data is sent from the server to the PC. Alternatively, the actual image data is sent to the server, and the thumbnail image data is created from the actual image data by the scan driver on the server. The actual image data can be deleted by specifying the thumbnail image data and performing the deletion instruction on the PC.

In other words, it is possible to cause the multifunction peripheral to read the original from the PC via the network, obtain the thumbnail image data via the network, and delete the image data stored in the server and corresponding to the thumbnail image data, and the like. Thereby, also in the thin client environment, the network scan function can be used with similar operability as the conventional client/server environment. Also, the load on the server in the server based computing environment can be reduced and also the read image can be rapidly checked. Moreover, since the reading instruction goes through the server 501, the server 501 can also manage the operation of the client PC, which may not compromise original purposes of the server based computing.

It should be noted that the preview image data is not limited to the thumbnail image, and its form is not limited if the form can achieve purposes of the preview.

In the above described embodiment, although the thin client environments shown in FIGS. 9 to 13 have been cited as the examples, the present invention is not limited thereto. The thin client environment can be arbitrarily configured without departing from the scope of the present invention.

In the above described embodiment, although the case of using the multifunction peripheral for the network scan has been given as the example, the present invention is not limited thereto. The scanner can also be used instead of the multifunction peripheral.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-241852, filed Sep. 6, 2006, which is hereby incorporated by reference herein in its entirety.

What is claimed is:

1. An image input/output system in which an image reading device, a server, and a client device are communicably connected to one another via a network, wherein:
said server comprises a receiving unit adapted to receive a reading instruction from said client device, and an instruction unit adapted to instruct said image reading device to read an original according to the reading instruction received at said receiving unit, and
said image reading device comprises a reading unit adapted to read the original based on the instruction from said instruction unit, and a sending unit adapted to send image data read by said reading unit to said client device without going through said server,
wherein said image reading device is adapted to attach information regarding a storage destination of actual image data to preview image data, and to send the preview image data to said client device by said sending unit, and
wherein said client device is adapted to perform a deletion instruction with respect to the actual image data, according to the storage destination information attached to the preview image data sent by said sending unit.

2. An image input/output system according to claim 1, wherein said sending unit sends the image data, based on address information on said client device included in the instruction from said instruction unit.

3. An image input/output system according to claim 1, wherein said sending unit is adapted to send preview image data to said client device without going through said server, and to send actual image data to said server.

4. An image input/output system according to claim 1, wherein said image reading device further comprises a determination unit adapted to determine whether or not said client device is provided with a nonvolatile memory capable of storing the image data, and
said sending unit is adapted to send the image data to said client device without going through said server in the case where said determination unit determines that said memory is provided, and to send the image data to said server in the case where said determination unit determines that said memory is not provided.

5. An image input/output system according to claim 1, wherein said image reading device further comprises a driver storage unit adapted to store an image reading driver adapted to control execution of the reading by said reading unit, and
said client device comprises an obtaining unit adapted to obtain the image reading driver stored in said driver storage unit, and an instruction unit adapted to instruct said image reading device to read by said reading unit by using the image reading driver obtained by said obtaining unit.

6. A control method of an image input/output system in which an image reading device, a server, and a client device are communicably connected to one another via a network, the control method comprising the steps of:

said server receiving a reading instruction from said client device, and instructing said image reading device to read an original according to the received reading instruction; and said image reading device reading the original based on the instruction received from said server, and sending read image data to said client device without going through said server wherein said image reading device attaches information regarding a storage destination of actual image data to preview image data, and sends the preview image data to said client device, and wherein said client device performs a deletion instruction with respect to the actual image data, according to the storage destination information attached to the preview image data.

7. A non-transitory computer-readable storage medium or a plurality thereof storing one or more programs for causing one or more computers to implement a control method of an image input/output system in which an image reading device, a server, and a client device are communicably connected to one another via a network, the control method comprising the steps of:

said server receiving a reading instruction from said client device, and instructing said image reading device to read an original according to the received reading instruction; and said image reading device reading the original based on the instruction received from said server, and sending read image data to said client device without going through said server, wherein said image reading device attaches information regarding a storage destination of actual image data to preview image data, and sends the preview image data to said client device, and wherein said client device performs a deletion instruction with respect to the actual image data, according to the storage destination information attached to the preview image data.

* * * * *